United States Patent
Kraft et al.

(10) Patent No.: US 9,648,436 B2
(45) Date of Patent: May 9, 2017

(54) AUGMENTED REALITY SOUND SYSTEM

(71) Applicant: Doppler Labs, Inc., New York, NY (US)

(72) Inventors: Noah Kraft, New York, NY (US); Richard Fritz Lanman, III, San Francisco, CA (US); Jeff Baker, Newbury Park, CA (US); Gints Klimanis, SunnyVale, CA (US); Anthony Parks, Brooklyn, NY (US); Daniel C. Wiggins, Montecito, CA (US)

(73) Assignee: Doppler Labs, Inc., San Francisco, CA (US)

(*) Notice: Subject to any disclaimer, the term of this patent is extended or adjusted under 35 U.S.C. 154(b) by 0 days.

(21) Appl. No.: 14/842,594

(22) Filed: Sep. 1, 2015

(65) Prior Publication Data

US 2015/0373474 A1    Dec. 24, 2015

Related U.S. Application Data

(63) Continuation-in-part of application No. 14/681,843, filed on Apr. 8, 2015.

(60) Provisional application No. 61/976,794, filed on Apr. 8, 2014.

(51) Int. Cl.
| | |
|---|---|
| *H04R 5/00* | (2006.01) |
| *H04S 5/00* | (2006.01) |
| *H04R 1/10* | (2006.01) |
| *H04W 4/02* | (2009.01) |
| *H04W 4/04* | (2009.01) |

(52) U.S. Cl.
CPC ............. *H04S 5/00* (2013.01); *H04R 1/1083* (2013.01); *H04W 4/02* (2013.01); *H04W 4/043* (2013.01)

(58) Field of Classification Search
CPC ........... H04S 5/00; H04W 4/043; H04W 4/02; H04R 1/1083
See application file for complete search history.

(56) References Cited

U.S. PATENT DOCUMENTS

| | | | |
|---|---|---|---|
| 5,566,237 | A | 10/1996 | Dobbs et al. |
| 5,576,685 | A | 11/1996 | Saito |
| 5,604,812 | A | 2/1997 | Meyer |
| 6,868,162 | B1 | 3/2005 | Jubien et al. |
| 7,283,850 | B2 | 10/2007 | Granovetter |
| 7,391,877 | B1 | 6/2008 | Brungart |

(Continued)

FOREIGN PATENT DOCUMENTS

| | | |
|---|---|---|
| EP | 2846328 | 3/2015 |
| WO | 2013069556 | 5/2013 |

*Primary Examiner* — Muhammad N Edun
(74) *Attorney, Agent, or Firm* — Van Pelt, Yi & James LLP

(57) ABSTRACT

An augmented reality sound systems is disclosed. An augmented reality sound system includes a at least one microphone for receiving ambient sound and a memory storing one or more augmented reality sound profiles and a respective set of processing parameters. The system further includes a processor coupled to the memory and configured to generate augmented ambient sound from the ambient sound by reproducing the ambient sound in conjunction with processed sound superimposed over the ambient sound as directed by one or more of the set of processing parameters retrieved from the memory based on a selected augmented reality sound profile.

22 Claims, 9 Drawing Sheets

(56) References Cited

U.S. PATENT DOCUMENTS

| | | |
|---|---|---|
| 8,306,204 B2 | 11/2012 | Erhart et al. |
| 8,335,312 B2 | 12/2012 | Gerhardt et al. |
| 8,649,540 B2 | 2/2014 | Killion et al. |
| 8,718,291 B2 | 5/2014 | Alves et al. |
| 8,750,544 B2 | 6/2014 | Killion et al. |
| 9,253,560 B2 | 2/2016 | Goldstein et al. |
| 2004/0052391 A1 | 3/2004 | Bren et al. |
| 2008/0112569 A1 | 5/2008 | Asada |
| 2008/0118078 A1 | 5/2008 | Asada et al. |
| 2008/0181419 A1 | 7/2008 | Goldstein et al. |
| 2010/0022269 A1 | 1/2010 | Terlizzi |
| 2010/0033313 A1 | 2/2010 | Keady et al. |
| 2010/0086137 A1 | 4/2010 | Nicolino et al. |
| 2010/0146445 A1 | 6/2010 | Kraut |
| 2010/0172510 A1 | 7/2010 | Juvonen |
| 2011/0096933 A1 | 4/2011 | Eastty |
| 2011/0103613 A1 | 5/2011 | Van Der Werf et al. |
| 2011/0158420 A1 | 6/2011 | Hannah |
| 2011/0188389 A1 | 8/2011 | Hedley et al. |
| 2011/0222700 A1 | 9/2011 | Bhandari |
| 2011/0228950 A1 | 9/2011 | Abrahamsson et al. |
| 2011/0243344 A1 | 10/2011 | Bakalos et al. |
| 2013/0208909 A1 | 8/2013 | Mulder |
| 2013/0236040 A1* | 9/2013 | Crawford ............... H04S 7/304 381/310 |
| 2014/0044269 A1 | 2/2014 | Anderson |
| 2014/0046659 A1 | 2/2014 | Burton et al. |
| 2014/0105412 A1 | 4/2014 | Alves et al. |
| 2014/0185828 A1 | 7/2014 | Helbling |
| 2014/0198926 A1 | 7/2014 | Killion et al. |
| 2014/0211972 A1 | 7/2014 | Kim et al. |
| 2014/0221017 A1 | 8/2014 | Jensen et al. |
| 2014/0277650 A1 | 9/2014 | Zurek et al. |
| 2014/0314245 A1 | 10/2014 | Asada et al. |
| 2014/0314261 A1 | 10/2014 | Selig et al. |
| 2014/0321660 A1 | 10/2014 | Harsch |
| 2014/0334644 A1 | 11/2014 | Selig et al. |
| 2015/0003652 A1 | 1/2015 | Bisgaard et al. |
| 2015/0063575 A1 | 3/2015 | Tan |
| 2015/0190284 A1 | 7/2015 | Di Censo et al. |
| 2016/0259619 A1 | 9/2016 | Appell et al. |

\* cited by examiner

AUGMENTED REALITY SOUND SYSTEM

RELATED APPLICATION INFORMATION

This patent is a continuation-in-part of co-pending patent application Ser. No. 14/681,843, entitled "Active Acoustic Filter with Location-Based Filter Characteristics," filed Apr. 8, 2015, which claims priority from provisional patent application 61/976,794, entitled "Digital Acoustical Filters for Use in Human Ears and Method for Using Same", filed Apr. 8, 2014, both of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates generally to an augmented reality sound system. In particular, this disclosure relates to augmenting ambient sound in an environment so as to add elements to ambient sound so as to emphasize or deemphasize particular characteristics of the ambient sound or to provide additional detail regarding the ambient sound or surroundings in addition to the ambient sound.

Description of the Related Art

Humans' perception to sound varies with both frequency and sound pressure level (SPL). For example, humans do not perceive low and high frequency sounds as well as they perceive midrange frequencies sounds (e.g., 500 Hz to 6,000 Hz). Further, human hearing is more responsive to sound at high frequencies compared to low frequencies.

There are many situations where a listener may desire emphasis or de-emphasis of ambient sound at certain frequencies, while allowing ambient sound at other frequencies to reach their ears. For example, during a riot, police or military personnel may wish to maintain typical ambient sounds without impeding hearing (for example, with an in-ear earbud for communications with group members) while enabling emphasis on particular types of sounds, such as gunshots or footsteps. Similarly, directionality of sound may be desirable so as to alert group members of dangerous locations or to better pinpoint danger.

Still further, superimposing augmented sound over ambient sound may be desirable in situations in which blocking out all or most ambient sound in order to provide additional direction or information in the audio may be dangerous. Removing ambient sound from one ear significantly reduces the human capability to determine the direction from which sound emanates. So, if the target of a police raid yells or takes a step, but one of a police officer's ears is filled with a small speaker, the officer may have only a vague idea of the direction from which the yell or step came.

In contrast, there are many situations in which additional sounds superimposed over ambient sound or in addition to ambient sound may be helpful. For example, individual, directions guiding an individual to a location or guiding an individual within a building or enclosed space may be useful. However, such direction or guidance may put the individual in harms way by either blocking out ambient sound through the use of a small in-ear speaker or by broadcasting the directions (and location) to anyone within earshot when using an out-of-ear speaker. Thus, reproducing the ambient sound with the directions superimposed over the ambient sound is preferable to either, more dangerous option. These and other uses of augmented reality for ambient sounds are discussed below.

Throughout this description, elements appearing in figures are assigned three-digit reference designators, where the most significant digit is the figure number where the element is introduced and the two least significant digits are specific to the element. An element not described in conjunction with a figure has the same characteristics and function as a previously-described element having the same reference designator.

DETAILED DESCRIPTION

Description of Apparatus

Figure 1:
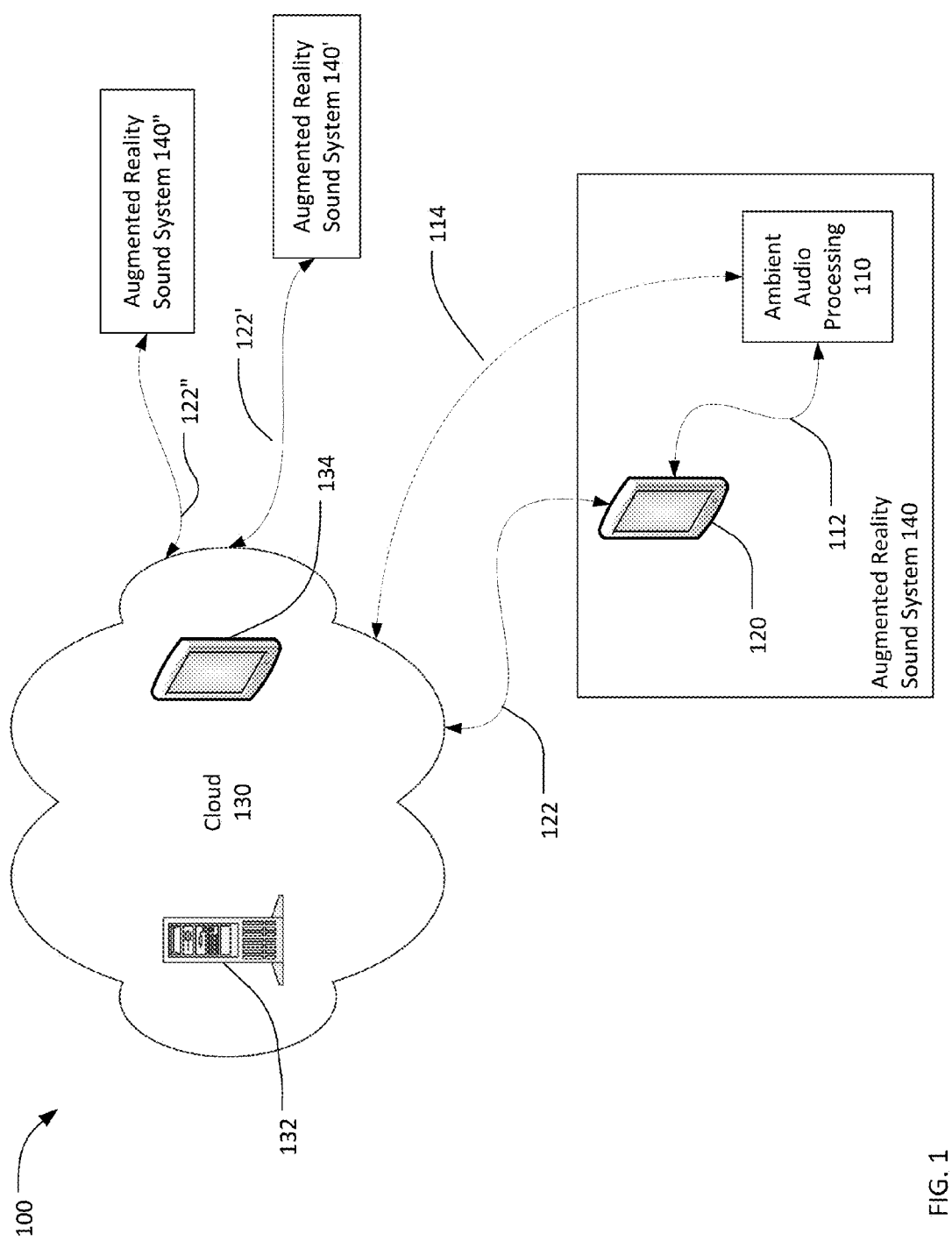
FIG. 1 is a block diagram of an environment.

Referring now to FIG. 1, an environment 100 may include a cloud 130 and an augmented reality sound system 140. In this context, the term "cloud" means a network and all devices that may be accessed by the augmented reality sound system 140 (and augmented reality sound systems 140' and 140") via the network. The cloud 130 may be a local area network, wide area network, a virtual network, or some other form of network together with all devices connected to the network. The cloud 130 may be or include the Internet. The devices within the cloud 130 may include one or more servers 132 and one or more personal computing devices 134.

The augmented reality sound system 140 includes an ambient audio processing system 110 and a personal computing device 120. While the personal computing device 120 is shown in FIG. 1 as a smart phone, the personal computing device 120 may be a smart phone, a desktop computer, a mobile computer, a tablet computer, or any other computing device that is capable of performing the processes described herein. The personal computing device 120 may include one or more processors and memory configured to execute stored software instructions to perform the processes described herein. For example, the personal computing device 120 may run an application program or "app" to perform some or all of the functions described herein. The personal computing device 120 may include a user interface comprising a display and at least one input device such as a touch screen, microphone, keyboard, and/or mouse. The personal computing device 120 may be configured to perform geo-location, which is to say to determine its own location. Geo-location may be performed, for example, using a Global Positioning System (GPS) receiver or by some other method.

The ambient audio processing system 110 may communicate with the personal computing device 120 via a first wireless communications link 112. The first wireless communications link 112 may use a limited-range wireless communications protocol such as Bluetooth®, Wi-Fi®, Zig-Bee®, or some other wireless Personal Area Network (PAN) protocol. The personal computing device 120 may communicate with the cloud 130 via a second communications link 122. The second communications link 122 may be a wired connection or may be a wireless communications link using, for example, the WiFi® wireless communications protocol, a mobile telephone data protocol, or another wireless communications protocol.

Optionally, the ambient audio processing system 110 may communicate directly with the cloud 130 via a third wireless communications link 114. The third wireless communications link 114 may be an alternative to, or in addition to, the first wireless communications link 112. The third wireless connection 114 may use, for example, the WiFi® wireless communications protocol, or another wireless communications protocol. Still further, the ambient audio processing system 110 may communicate with the cloud 130 through the second communications link 122 of the personal computing device 120 and the first communications link 112.

Similar arrangements may be available in the additional augmented reality sound systems 140' and 140" which are only partially shown in FIG. 1. The details of those limitations are not described here because they are substantially the same as with augmented reality system 140. Multiple augmented reality sound systems 140, 140' and 140" may use the cloud 130 to communicate with one another as will be discussed more fully below with reference to FIGS. 7 and 9. This communication may, for example, enable the augmented reality sound systems 140, 140', 140" to better characterize ambient sound or to better-determine the location of a particular ambient sound.

Figure 2:
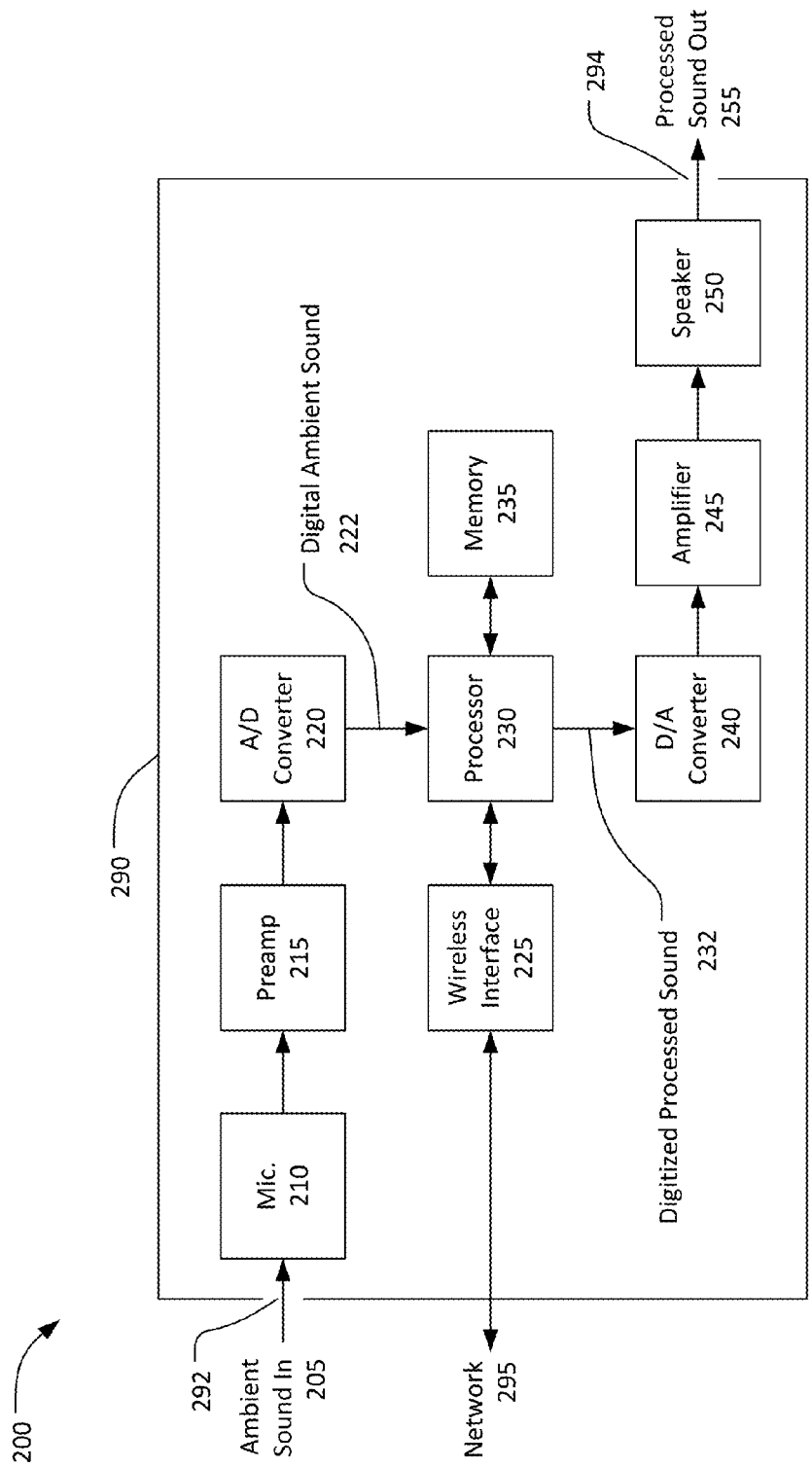
FIG. 2 is block diagram of an augmented reality sound system.

FIG. 2 is block diagram of an ambient audio processing system 200 suitable for use as the ambient audio processing system 110 within the augmented reality sound system 140. The ambient audio processing system 200 may include a microphone 210, a preamplifier 215, an analog-to-digital (A/D) converter 220, a wireless interface 225, a processor 230, a memory 235, an analog signal by digital-to-analog (D/A) converter 240, and amplifier 245, a speaker 250, and a battery (not shown), all of which may be contained within a housing 290. The housing 290 may be configured to interface with a user's ear by fitting in, on, or over the user's ear such that ambient sound is mostly excluded from reaching the user's ear canal and processed sound generated by the ambient audio processing system 200 is coupled into the user's ear canal. The housing 290 may have a first aperture 292 for accepting ambient sound and a second aperture 294 to allow processed sound to be output into the user's outer ear canal.

The housing 290 may be, for example, an earbud housing. The term "earbud" means an apparatus configured to fit, at least partially, within and be supported by a user's ear. An earbud housing typically has a portion that fits within or against the user's outer ear canal. An earbud housing may have other portions that fit within the concha or pinna of the user's ear.

The microphone 210 converts ambient sound 205 into an electrical signal that is amplified by preamplifier 215 and converted into digital ambient sound 222 by A/D converter 220. The digital ambient sound 222 may be processed by processor 230 to provide digitized processed sound 232. The processing performed by the processor 230 will be discussed in more detail subsequently. The digitized processed sound 232 is converted into an analog signal by D/A converter 240. The analog signal output from D/A converter 240 is amplified by amplifier 245 and converted into processed output sound 255 by speaker 250.

The depiction in FIG. 2 of the ambient audio processing system 200 as a set of functional blocks or elements does not imply any corresponding physical separation or demarcation. All or portions of one or more functional elements may be located within a common circuit device or module. Any of the functional elements may be divided between two or more circuit devices or modules. For example, all or portions of the analog-to-digital (A/D) converter 220, the wireless interface 225, the processor 230, the memory 235, the analog signal by digital-to-analog (D/A) converter 240, and the amplifier 245 may be contained within a common signal processor circuit device.

The microphone 210 may be one or more transducers for converting sound into an electrical signal that is sufficiently compact for use within the housing 290.

The preamplifier 215 may be configured to amplify the electrical signal output from the microphone 210 to a level compatible with the input of the A/D converter 220. The preamplifier 215 may be integrated into the A/D converter 220, which, in turn, may be integrated with the processor 230. In the situation where the ambient audio processing system 200 contains more than one microphone, a separate preamplifier may be provided for each microphone.

The A/D converter 220 may digitize the output from preamplifier 215, which is to say convert the output from preamplifier 215 into a series of digital ambient sound samples at a rate at least twice the highest frequency present in the ambient sound. For example, the A/D converter may output digital ambient sound 222 in the form of sequential sound samples at rate of 40 kHz or higher. The resolution of the digitized ambient sound 222 (i.e. the number of bits in each sound sample) may be sufficient to minimize or avoid audible sampling noise in the processed output sound 255. For example, the A/D converter 220 may output digitized ambient sound 222 having 12 bits, 14, bits, or even higher resolution. In the situation where the ambient audio processing system 200 contains more than one microphone with respective preamplifiers, the outputs from the preamplifiers may be digitized separately, or the outputs of some or all of the preamplifiers may be combined prior to digitization.

The wireless interface 225 may provide ambient audio processing system 200 with a connection to one or more wireless networks 295 using a limited-range wireless communications protocol such as Bluetooth®, Wi-Fi®, Zig-Bee®, or other wireless personal area network protocol. The wireless interface 225 may be used to receive data such as parameters for use by the processor 230 in processing the digital ambient sound 222 to produce the digitized processed sound 232. The wireless interface 225 may be used to export the digitized processed sound 232, which is to say transmit the digitized processed sound 232 to a device external to the ambient audio processing system 200. The external device may then, for example, store and/or publish the digitized processed sound, for example via social media.

The processor 230 may include one or more processor devices such as a microcontroller, a microprocessor, and/or a digital signal processor. The processor 230 can include and/or be coupled to the memory 235. The memory 235 may store software programs, which may include an operating system, for execution by the processor 230. The memory 235 may also store data for use by the processor 230. The data stored in the memory 235 may include, for example, digital sound samples and intermediate results of processes performed on the digital ambient sound 222. The data stored in the memory 235 may also include a user's listening preferences, and/or rules and parameters for applying particular processes to convert the digital ambient sound 222 into the digitized processed sound 232. The memory 235 may include a combination of read-only memory, flash memory, and static or dynamic random access memory.

The D/A converter 240 may convert the digitized processed sound 232 from the processor 230 into an analog signal. The processor 230 may output the digitized processed sound 232 as a series of samples typically, but not necessarily, at the same rate as the digital ambient sound 222 is generated by the A/D converter 220. The analog signal output from the D/A converter 240 may be amplified by the amplifier 245 and converted into processed output sound 255 by the speaker 250. The amplifier 245 may be integrated into the D/A converter 240, which, in turn, may be integrated with the processor 230. The speaker 250 can be any transducer for converting an electrical signal into sound that is suitably sized for use within the housing 290.

The battery (not shown) may provide power to various elements of the ambient audio processing system 200. The battery may be, for example, a zinc-air battery, a lithium ion battery, a lithium polymer battery, a nickel cadmium battery, or a battery using some other technology.

Figure 3:
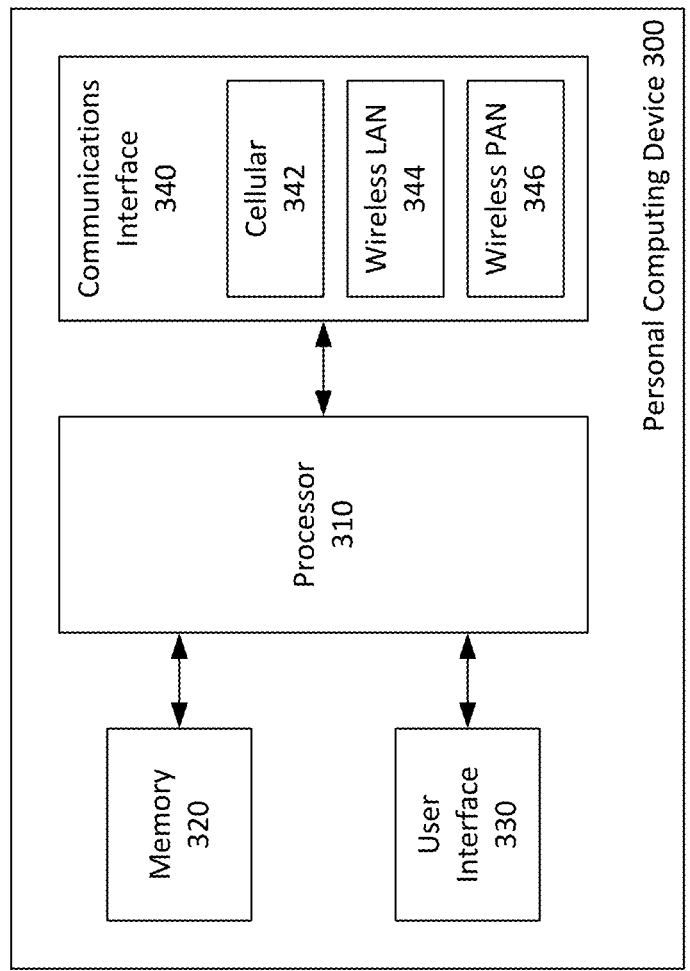
FIG. 3 is a block diagram of a personal computing device.

FIG. 3 is a block diagram of an exemplary personal computing device 300 which may be suitable for the personal computing device 120 within the augmented reality sound system 140. As shown in FIG. 3, the personal computing device 300 includes a processor 310, memory 320, a user interface 330, and a communications interface 340. Some of these elements may or may not be present, depending on the implementation. Further, although these elements are shown independently of one another, each may, in some cases, be integrated into another.

The processor 310 may be or include one or more microprocessors, microcontrollers, digital signal processors, application specific integrated circuits (ASICs), or a system-on-a-chip (SOCs). The memory 320 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The communications interface 340 includes at least one interface for wireless communications with external devices. The communications interface 340 may include one or more of a cellular telephone network interface 342, a wireless Local Area Network (LAN) interface 344, and/or a wireless PAN interface 346. The cellular telephone network interface 342 may use one or more of the known 2G, 3G, and 4G cellular data protocols. The wireless LAN interface 344 may use the WiFi® wireless communications protocol or another wireless local area network protocol. The wireless PAN interface 346 may use a limited-range wireless communications protocol such as Bluetooth®, Wi-Fi®, ZigBee®, or some other wireless personal area network protocol. When the personal computing device is deployed as part of an active acoustic filter system, such as the augmented reality sound system 140, the wireless PAN interface 346 may be used to communicate with one or more active acoustic filter device 110. The cellular telephone network interface 342 and/or the wireless LAN interface 344 may be used to communicate with the cloud 130.

The communications interface 340 may include radio-frequency circuits, analog circuits, digital circuits, one or more antennas, and other hardware, firmware, and software necessary for communicating with external devices. The communications interface 340 may include one or more processors to perform functions such as coding/decoding, compression/decompression, and encryption/decryption as necessary for communicating with external devices using selected communications protocols. The communications interface 340 may rely on the processor 310 to perform some or all of these function in whole or in part.

The memory 320 may store software programs and routines for execution by the processor. These stored software programs may include an operating system such as the Apple® or Android® operating systems. The operating system may include functions to support the communications interface 340, such as protocol stacks, coding/decoding, compression/decompression, and encryption/decryption. The stored software programs may include an application or "app" to cause the personal computing device to perform portions of the processes and functions described herein.

The user interface 330 may include a display and one or more input devices including a touch screen.

Figure 4:
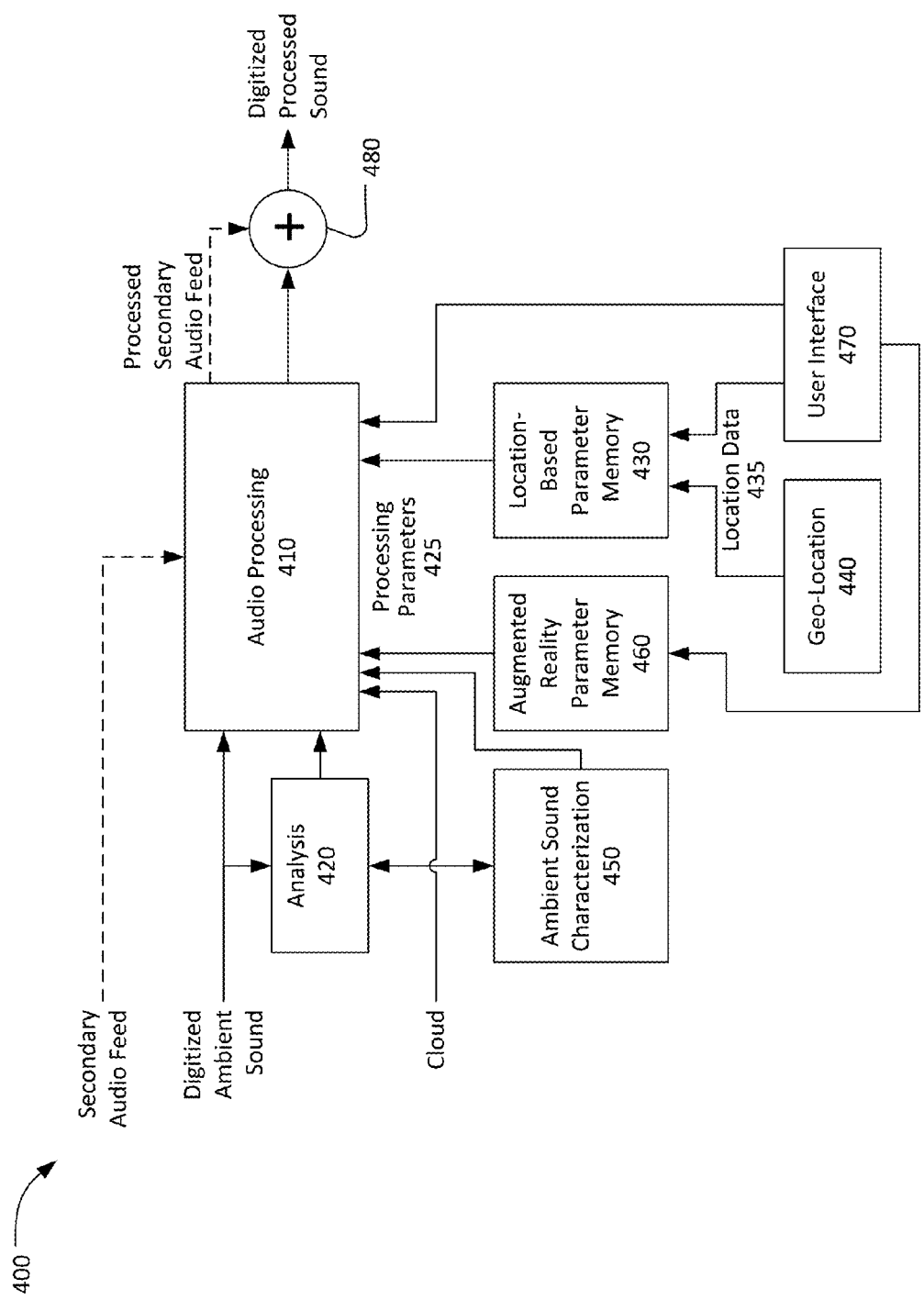
FIG. 4 is a functional block diagram of a portion of an augmented reality sound system.

FIG. 4 shows a functional block diagram of a portion of an augmented reality sound system 400, which may be the augmented reality sound system 140. Digitized ambient sound may be received, for example, from an A/D converter such as the A/D converter 220. The digitized ambient sound is processed by an audio processing function 410 implemented by a processor such as the processor 230. The processor performing the audio processing function may include one or more processor devices such as a microcontroller, a microprocessor, and/or a digital signal processor. The audio processing function 410 may include filtering, equalization, compression, limiting, and other processes. Filtering may include high-pass, low-pass, band-pass, and band-reject filtering. Equalization may include dividing the ambient sound into a plurality of frequency bands and subjecting each of the bands to a respective attenuation or gain. Equalization may be combined with filtering, such as a narrow band-reject filter to suppress a particular objectionable component of the ambient sound. Compression may be used to alter the dynamic range of the ambient sound such that louder sounds are attenuated more than softer sounds. Compression may be combined with filtering or with equalization such that louder frequency bands are attenuated more than softer frequency bands. Limiting may be used to attenuate louder sounds to a predetermined loudness level without attenuating softer sounds. Limiting may be combined with filtering or with equalization such that louder frequency bands are attenuated to a defined level while softer frequency bands are not attenuated or attenuated by a smaller amount. Techniques for implementing filters, compressors, and limiters are known to those of skill in the art of digital signal processing.

The audio processing function 410 may also include adding echo or reverberation to the ambient sound. The audio processing function 410 may also include detecting and cancelling an echo in the ambient sound. The audio processing function 410 may further include noise reduction processing. Techniques to add or suppress echo, to add reverberation, and to reduce noise are known to those of skill in the art of digital signal processing.

The audio processing function 410 may also include active noise cancellation (ANC) where anti-sound is generated to counter-act undesirable sound that passively propagates through the earbud into the ear canal. The ANC may be a of feedforward type, where sound at the outer microphone is used to generate the anti-sound. Or, it may be of a feedback variety, where sound at the inner microphone is used to generate the anti-sound. Active noise cancellation could also be a hybrid variety, where the anti-sound uses information from both microphones. The ANC algorithm may be adaptive, with parameters that are actively adjusted to maximize effectiveness. The techniques of ANC are known to those practiced in the art.

The audio processing function 410 may be performed in accordance with processing parameters 425 provided from augmented reality parameter memory 460 and location based parameter memory 430. Together, and wherever drawn from, the processing parameters 425 used to process the ambient sound in conjunction with the characteristics of the ambient sound that identify a particular set of processing parameters 425 to be used may define a particular augmented reality sound profile. That is, a series of processing parameters, directing the audio processing function how to operate upon the digitized ambient sound are an augmented reality sound profile. Multiple augmented reality sound profiles may be created and stored in the augmented reality parameter memory 460.

The processing parameters 425 may define the type and degree of one or more processes to be performed on the digitized ambient sound. For example, the processing parameters 425 may define filtering by a low pass filter with a particular cut-off frequency (the frequency at which the filter start to attenuate) and slope (the rate of change of attenuation with frequency) and/or compression using a particular function (e.g. logarithmic). For further example, the processing parameters 425 may define overlay audio in one of many forms. In yet another example, the processing parameters 425 may identify a secondary live audio to superimpose over ambient audio. The number and format of the processing parameters 425 may vary depending on the type of processing to be performed.

The audio processing function 410 may be defined, in part, based on analysis of the ambient sound by an analysis function 420, which may be implemented by the same processor, or a different processor, as the audio processing function 410. The analysis function 420 may analyze the digitized ambient sound to determine, for example, an overall (i.e. across the entire audible frequency spectrum) loudness level or the loudness level within particular frequency bands. For further example, the analysis function 420 may transform the digitized ambient sound and/or the digitized sound output from the audio processing function 410 into the frequency domain using, for example, a windowed Fourier transform. The transformed sound may then be analyzed to determine the distribution of the ambient sound within the audible frequency spectrum and/or to detect the presence of dominant sounds at particular frequencies. The analysis function 420 may perform other analysis to determine other characteristics of the digitized ambient sound.

A portion of the processing parameters 425 for the audio processing function 410 may define processes dependent on the analysis of the ambient sound. For example, a first processing parameter may require that the overall loudness of the processed sound output from the active acoustic filter system 400 be less than a predetermined value. The analysis function 420 may determine the overall loudness of the ambient sound and the audio processing function 410 may than provide an appropriate amount of overall attenuation The processing parameters 425 may be received or retrieved from several sources. The processing parameters 425 may be received from a user of the augmented reality sound system 400. The user may manually enter processing parameters via a user interface 470, which may be the user interface of a personal computing device such as the personal computing device 120. Alternatively, a microphone accessible to the audio processing function 410 (such as mic 210) or a microphone (not shown) in portable computing device 300 may provide input based upon ambient sound that is used in conjunction with the audio processing function 410 and other processing parameters 425 to adjust the active acoustic filter system 400. This input may be spoken commands or may merely be the audio environment of the ambient sound such that the system may characterize that ambient sound in order to derive appropriate processing parameters 425.

The processing parameters 425 may be received from a device or devices available via a computer network or otherwise available within the cloud 130. For example, a website accessible via the cloud 130 may list recommended sets of processing parameters for different venues, bands, sporting events, and the like. These processing parameters 425 may be generated, in part, based upon feedback regarding the ambient sound from multiple augmented reality sound systems 140, 140', and 140" in communication with one another using the cloud 130. Similarly, a setting change on one of a group of interconnected augmented reality sound systems 140, 140', and 140" may be propagated to all.

The processing parameters 425 may be, at least in part, location-based, which is to say the processing parameters 425 may be associated with a current location of the augmented reality sound system 400. The current location may be a specific location (e.g. "user's living room", "user's office", "Fenway Park", "Chicago O'Hare Airport", etc.) or a generic location (e.g. "sporting event", "dance club", "concert", "airplane", etc.). A location-based parameter memory 430 may store one or more sets of location-based processing parameters in association with data defining respective locations. The appropriate processing parameters may be retrieved from location-based parameter memory 430 based on location data 435 identifying the current location of the augmented reality sound system 400.

The location data 435 may be provided by a geo-location function 440. The geo-location function may use GPS, cell tower signal strength, a series of relative-location calculations based upon interconnected augmented reality sound systems 140, 140', and 140" or some other technique for identifying the current location. The location data 435 may be provided by the user via the user interface 470. For example, the user may select a location from a list of locations for which processing parameters are stored in the location-based parameter memory 430. The location data 435, particularly for a generic location, may be retrieved from a cloud external to the augmented reality sound system 400. The location data 435 may obtained by some other technique.

The one or more sets of location-based processing parameters may have been stored in the location-based parameter memory 430 during prior visits to the corresponding locations. For example, the user of the augmented reality sound system 400 may manually set processing parameters for their home and save the processing parameters in the location-based parameter memory 430 in association with the location "home". Similarly, the user may set and save processing parameters for other locations (e.g. "work", "patrol", etc.). Upon returning to these locations (or to locations defined in the negative (not "home", not "work", etc.), the corresponding processing parameters may be automatically retrieved from the location-based parameter memory 430.

The processing parameters 425 may be based, at least in part, upon ambient sound, which is to say the processing parameters 425 may be associated with particular characteristics of the ambient sound. The augmented reality sound system 400 may "listen" to the ambient sound and learn what filter parameters the user sets in the presence of various ambient sound characteristics. Once the ambient sound has been characterized, the augmented reality sound system 400 may select or suggest processing parameters 425 appropriate for the characteristics of the current ambient sound.

For example, an augmented reality parameter memory 460 may store one or more augmented reality sound profiles identifying respective sets of processing parameters 425 to be applied to ambient audio as those processing parameters 425 have been previously defined by the user, by a manufacturer, by a supervisor, or by an organization of which a wearer is a member or visitor for use in a particular environment or situation. The processing parameters 425 may also be provided by a third party such as event promoter, a concert audio technician, or other audio source present at a location or event. For example, a concert audio technician could provide processing parameters 425 that are "recommended" for that particular concert. A user of an augmented reality sound system 140 could select these parameters or an audio cue in the ambient sound could cause the augmented reality sound system 140 to adopt (or recommend) these processing parameters 425 by prompting the system 140 to access the processing parameters 425 available at a network location (e.g. similar functionality to an audio QR code). The augmented reality parameter memory 460 may be local memory, like memory 320 in FIG. 3, but also may be memory accessible to the augmented reality sound system 400, such as remote memory accessible via a network.

Each stored augmented reality sound profile may include characteristics such as, for example, frequencies to attenuate or increase in volume, instructions to emphasize on sounds that already stand out from the overall ambient sound environment (e.g., footsteps, dogs barking, animal sounds, human voices, whispers, weapon noises, etc.) while deemphasizing (e.g. decreasing the overall volume) of other ambient sounds, elements of sound to emphasize, aspects to superimpose over ambient audio or identifications of databases and algorithms from which to draw audio for superimposition over ambient audio, locational feedback algorithms for emphasizing locations of certain sounds or frequency ranges, sources of live audio to superimpose over ambient sound or other, similar profiles.

An ambient sound characterization function 450, which may work in conjunction with or in parallel to the analysis function 420, may develop an augmented reality sound profile of the current ambient sound. The profile determined by the ambient sound characterization function 450 may be used to retrieve an appropriate augmented reality sound profile, including the associated processing parameters 425 from the augmented reality parameter memory 460. This retrieval may rely in part upon the location data 435 and location-based parameter member 430.

The one or more sets of processing parameters 425 making up one or more augmented reality sound profiles may have been stored in the augmented reality parameter memory 460 during prior exposure to ambient sound having particular profiles. For example, the user of the augmented reality sound system 400 may manually set processing parameters 425 during a visit to a dance club. These processing parameters 425 may be saved in the augmented reality parameter memory 430 in association with the profile of the ambient sound in the dance club. The processing parameters 425 may be saved in the augmented reality parameter memory 430 in response to a user action, or may be automatically "learned" by the active augmented reality sound system 400. Upon encountering similar ambient audio, the appropriate processing parameters 425 may be automatically retrieved from the augmented reality parameter memory 460.

While FIG. 4 depicts the augmented reality parameter memory 460 and the location-based parameter memory 430 separately, these may be a common memory that associates each stored set of processing parameters 425 with a location, with an ambient sound profile, or both. Thus, one or both of augmented reality parameters and location-based parameters may be taken into account when selecting or suggesting processing parameters 425 for an augmented reality sound system 400.

Optionally, an adder 480 may cause a secondary audio feed to be incorporated into the audio output from the audio processing function 410 to produce the digitized processed sound. The secondary audio feed may be received by the augmented reality sound system 400 from an external source via a wireless communications link and the secondary audio may, optionally (shown in dashed lines) be processed by the audio processing function 410 before being added to the ambient sound. The secondary audio feed may be attenuated or amplified before combination with the ambient sound. The secondary audio feed may also be processed in any of the ways described with respect to the ambient sound. The secondary audio may be spatialized (made to seem artificially localized) in order to enhance distinguishability from the ambient sound. For example, a user at a sporting event may receive a secondary audio feed of a sportscaster describing the event, which may then be superimposed on the processed ambient sound of the event itself. This sportscaster may be artificially localized to above and behind (as if he or she is in the announcer booth) and may have an echo added, as though the sportscaster's voice is echoing in the stadium.

The depiction in FIG. 4 of the augmented reality sound system 400 as a set of functional blocks or elements does not imply any corresponding physical separation or demarcation. All or portions of one or more functional elements may be located within a common circuit device or module. Any of the functional elements may be divided between two or more circuit devices or modules. For example, all or portions of the audio processing function 410, the analysis function 420, and the adder 480 may be implemented within an augmented reality sound system packaged within an earbud or other housing configured to interface with a user's ear. The ambient sound characterization function 450, the augmented reality parameter memory 460 and the location-based parameter memory 430 may be distributed between the augmented reality sound system and a personal computing device coupled to the augmented reality sound system by a wireless communications link.

Description of Processes

Figure 5:
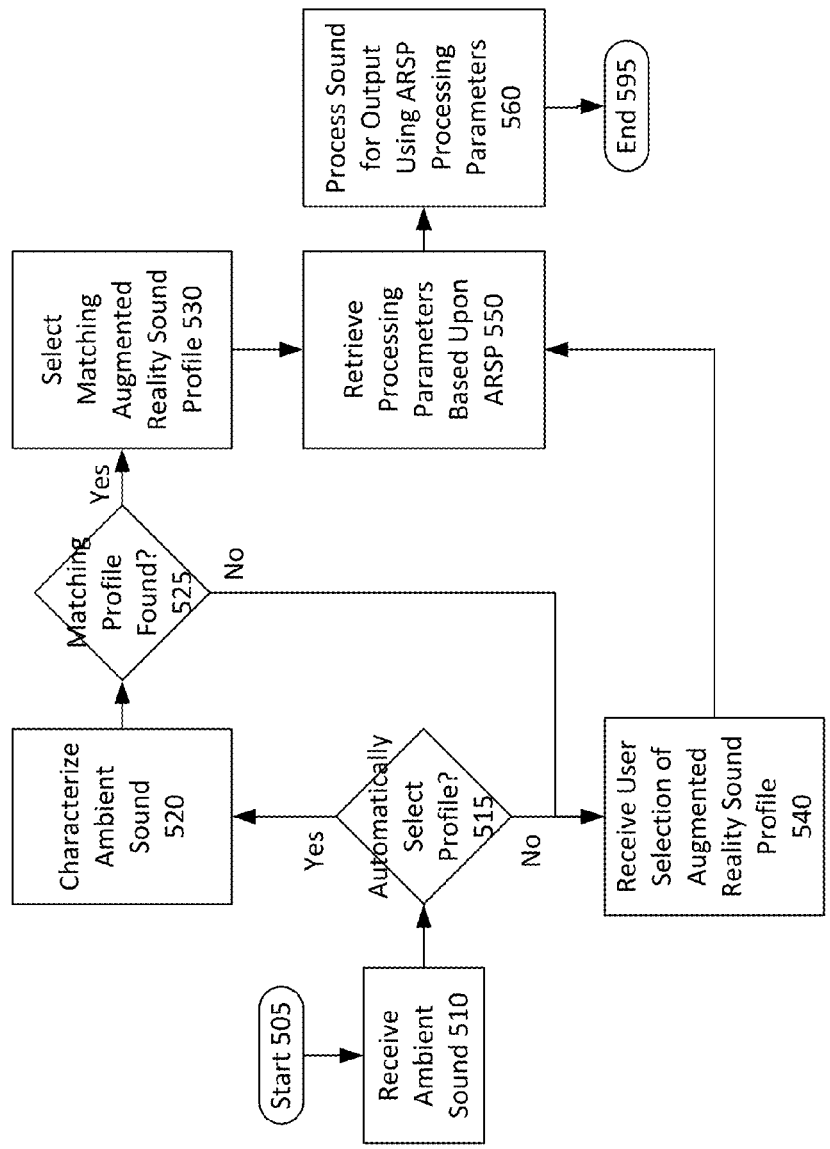
FIG. 5 is a flow chart of a method for setting processing parameters for an augmented reality sound system.

Referring now to FIG. 5, a flow chart of a process 500 for setting processing parameters for an augmented reality sound system is shown. The process begins at 505 and ends at 595. The process 500 may occur many times, either automatically as ambient sound changes or upon user interaction with a user interface, such as user interface 470 (FIG. 4). The process 500 results in selection, either automatically or based upon user selection, of an augmented reality sound profile.

First, ambient sound is received at 510. This ambient sound may be merely typical outdoor noise, noise associated with a loud location (e.g. concert, a factory, etc.), noise associated with a quiet location—such that all noises may be increased in volume to aid in hearing, sounds associated with a particular event (e.g. a sporting event, a parade, a conference) or other ambient sounds.

After receipt of the ambient sound 510, a determination is made whether automatic selection of an augmented reality sound profile will be done at 515. This may be, for example, based upon a user selection indicating that the user (or leader of a group of users) may wish the augmented reality sound system to automatically select a sound profile based upon one or more factors. Alternatively, this setting may be enabled by default in all situations such that characterization is attempted and user interaction is only required should characterization fail. The process 500 may be initiated by a user, or may be initiated automatically at regular intervals or in recognition of a significant change in the characteristics of the ambient sound.

If automatic selection is enabled ("yes" at 515), then the augmented reality sound system characterizes the ambient sound at 520. This characterization may result in the creation of am ambient sound profile. The ambient sound profile is a profile of the characteristics of the ambient sound. The ambient sound profile may include characteristics such as an overall loudness level, normalized or absolute acoustic power within predetermined frequency bands, normalized or absolute power level of dominant narrow-band sounds and/or random noise, beat or onset frequency (when the ambient sound includes music), prevalence of low frequency periodicity, spectral envelope shape, harmonics (e.g. the presence of multiple harmonics or of odd or even harmonics), spectrographic features such as rising or falling pitch, and/or other characteristics.

At 525, a determination whether a sound profile matching the characterized ambient sound profile has been found is made by the augmented reality sound system. This process is discussed more fully below with respect to FIG. 6.

Figure 6:
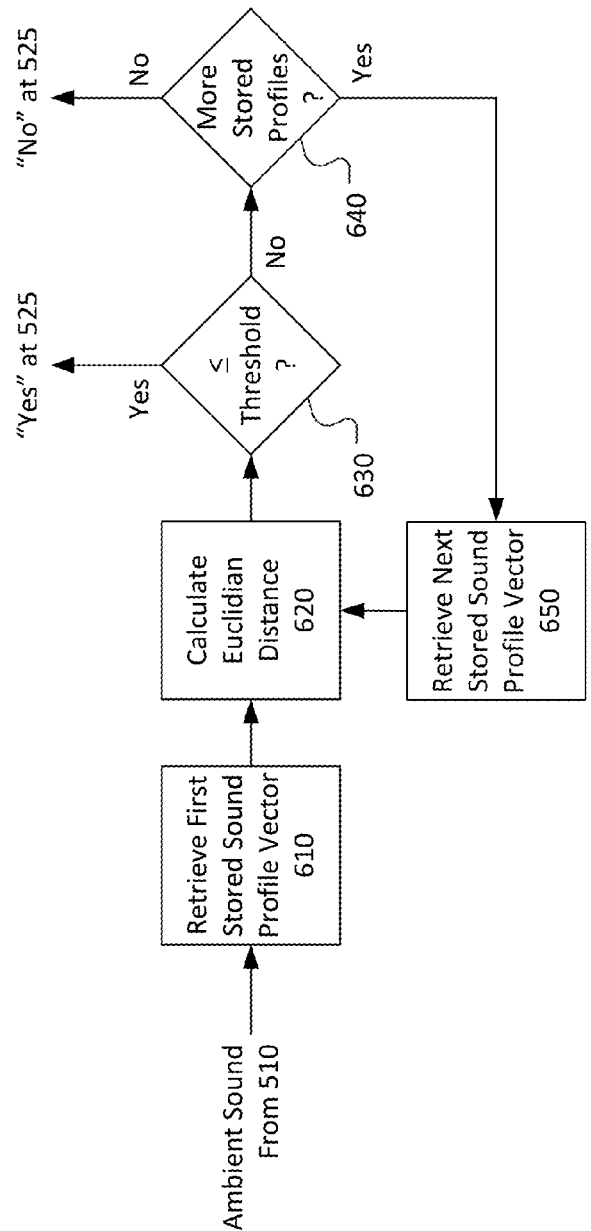
FIG. 6 is a flow chart of a method for comparing sound profiles.

An exemplary process for determining whether or not the ambient sound profile matches a stored sound profile is shown in FIG. 6. In this example, the ambient sound profile and each of the stored sound profiles consist of an ordered set of n numbers (where n is a positive integer) representing various parameters of the sound as previously described (e.g. overall loudness level, normalized or absolute acoustic power within predetermined frequency bands, normalized or absolute power level of dominant narrow-band sounds and/or random noise, beat or onset frequency, etc.). Thus the ambient sound profile and each stored sound profile may be considered as vectors in an n-dimensional space. Comparison of the ambient sound profile and a stored sound profile may then be performed using similarity metrics, such as calculating the Euclidean distance between the corresponding vectors, spectral or spectrographic (spectrum versus time) comparisons, or other similarity metrics known to those of skill in the art.

The process 600 may begin after an ambient sound profile is computed at 525 in the process 500. At 610, a first one of one or more stored sound profiles may be retrieved from memory. Each of the one or more stored sound profiles may be stored in a memory is association with a set of processing parameters. The Euclidean distance between the ambient sound profile and the retrieved sound profile may be calculated at 620. At 630, a determination may be made if the calculated Euclidean distance is less than or equal to a predetermined threshold. When the Euclidean distance is less than or equal to the predetermined threshold ("yes" at 630), the ambient sound profile may be considered to match the retrieved sound profile and the process 600 may return a "yes" answer at 525 in the process 500.

When the Euclidean distance is greater than the predetermined threshold ("no" at 630), a further determination may be made if additional stored sound profiles are available for comparison. When there are more stored sound profiles ("Yes" at 640), a next stored sound profile may be retrieved at 640 and the process 600 may repeat until a match is found at 630 or all of the stored sound profiles have been compared to the ambient sound profile. When all of the stored sound profiles have been compared to the ambient sound profile without finding a match ("no" at 640), the process 600 may return a "no" answer at 525 in the process 500.

Returning again to FIG. 5, if a matching sound profile is found ("yes" at 525), then the matching augmented reality sound profile is selected at 530. This profile includes settings directing the operations of the augmented reality sound system.

If a user or administrator of the augmented reality sound system has selected not to perform automatic selection ("no" at 515), or if no matching profile is found ("no" at 525), then user selection of augmented reality sound profile may be received at 540. This process may be prompted by a user interface interaction, audible sound generated within the speakers of the augmented reality sound system 400 or other, similar methods. For example, a user may be prompted by a sound and a popup on a personal computing device (such as personal computing device 120) in communication with the ambient audio processing (such as the ambient audio processing 110) to select or input settings related to a desired augmented reality sound profile.

One received at 540 (or automatically selected at 530), the processing parameters associated with the selected augmented reality sound profile are retrieved from memory at 550. This may involve retrieval from one or both of the augmented reality parameter memory 460 or the location-based parameter memory 430.

Thereafter, ambient sound is processed for output using the augmented reality sound profile processing parameters at 560. As discussed above, these parameters may direct the audio processing 410 to increase or decrease the relative volume of particular frequencies, shapes of sound (e.g. a gunshot) or to overlay ambient sound with further audible information (for example, inserting directional audio prompts into ambient sound to better localize the direction from which particular audio came). Explain inhibited human localization, this may aid.

Once the processing begins using the processing parameters associated with the augmented reality sound profile at 560, the process ends at 595. However, the augmented reality sound processing continues using the same processing parameters until prompted, either by a change in the ambient sound type or by user interaction, to change at which point the process begins again at 505 to select a new augmented reality sound profile.

Figure 7:
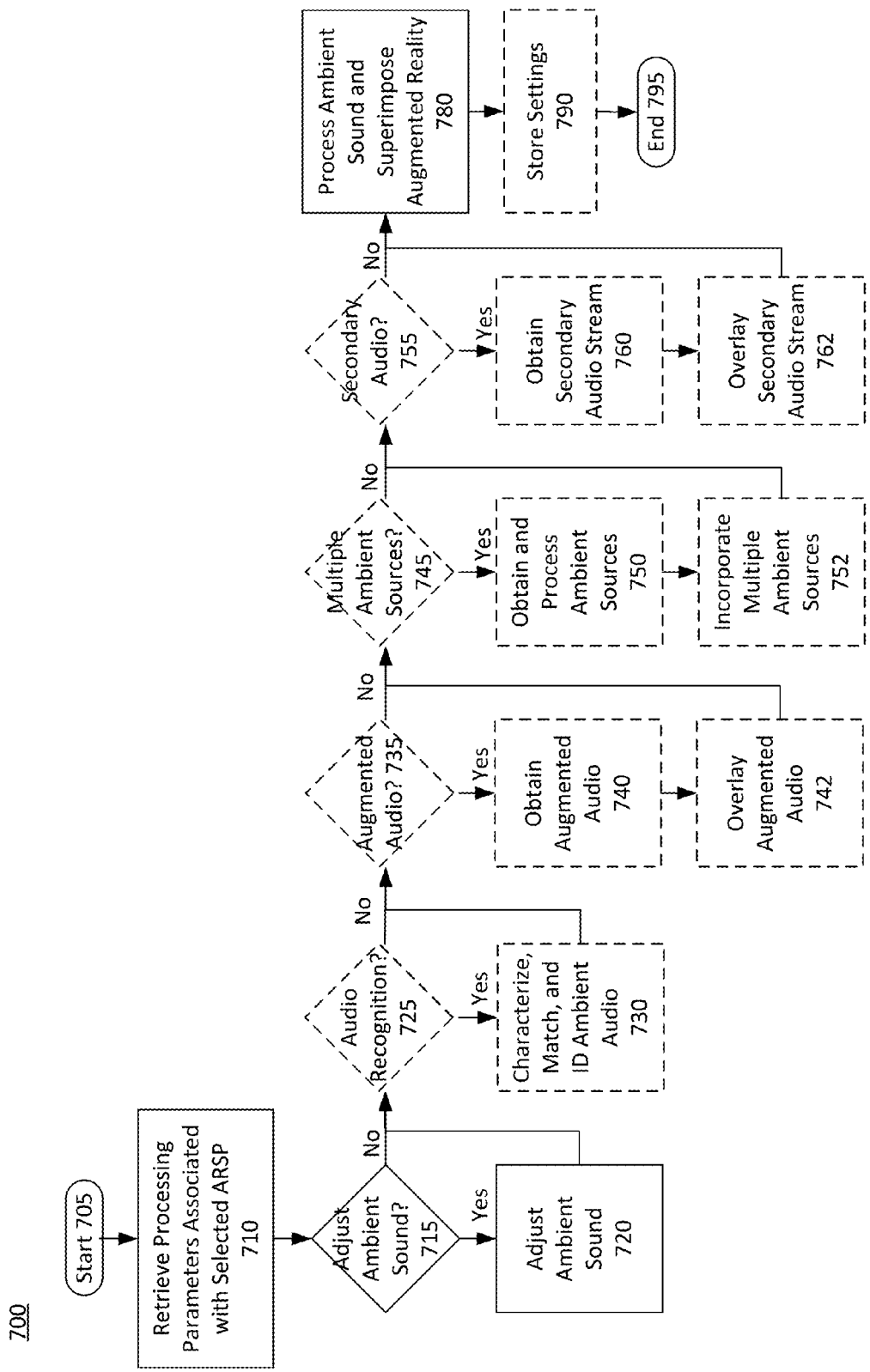
FIG. 7 is a flow chart of a method for processing ambient sound and superimposing augmented audio.

Referring now to FIG. 7, a flow chart of a process 700 for processing ambient sound and superimposing augmented audio, such as what may be undertaken by the augmented reality sound system 140, begins at 705 and may run continuously until stopped by a user action (not shown). The process 700 may be initiated by a user, or may be initiated automatically at regular intervals or in recognition of changes in the characteristics of the ambient sound.

First, the processing parameters associated with the selected augmented reality sound profile are retrieved from memory (e.g. augmented reality parameter memory 460 or location-based parameter memory 430) at 710. These parameters may include relatively basic processing adjustments to ambient sound that may take place prior to any augmentation. So, as a first step, a determination is made whether the processing parameters include any such adjustments for the ambient sound at 715. If so ("yes" at 715), these adjustments are made to the ambient sound at 720.

These adjustments may act as high pass filters or low pass filters, act to equalize the ambient audio, may lower or raise the overall volume of the ambient sound, or may lower or raise the volume of particular ranges of frequencies while performing the opposition operation on other frequencies. For example, all sounds except human voices may be decreased in volume using ranges of generalized frequencies associated with human speech while those same ranges for human voices are increased in volume. If the augmented reality sound system is used in the context of a crowd of people, the overall crowd volume may be lowered by removing frequencies of a type that is associated with crowd noises. If the augmented reality sound system is used in a location with a great deal of low, throbbing background noise such as a music club or a factory, that noise may be substantially reduced in volume relative to other frequency ranges as a first step to providing augmented reality sound.

The adjustments may further include audio processing to cause the ambient sound to take on the audio characteristics of a different location. For example, adjustments may alter ambient sounds to incorporate reverbs, echoes and other audio characteristics of locations such as caves, particular recording studios, stadiums, theaters, or outdoor venues. Similarly, the audio characteristics may alter ambient sound to appear as if it is coming from a particular location or type of location such as concentrating the sound in a single three-dimensional location (e.g. to the North of one's present location) or cause it to move from place to place (e.g. travel or move around a location).

For example, sound may be spatialized by delaying a sound for one ear slightly behind another and altering the higher frequency content to change positioning in the axial plane, altering the frequency content over time or by adding a slight reverb, by changing the reverb characteristics such that the ratio of direct to perceived "reflected" sound is altered to be more-closely like that of sound from a specific distance, or by changing the relative frequency content of the direct sound compared to the perceived reflected sound and/or by imposing a complex frequency response modeled on the pinnae (of the human ear) to alter the perception of the angle of incidence in three dimensions.

If no adjustments are made ("no" at 715) or following any adjustment at 720, whether the augmented reality sound profile calls for secondary audio is determined at 725. This step is shown in dashed lines (like steps 730, 732, 735, 740, 742, 745, 750, 752, 760, and 762) because it is optional. Some augmented reality sound profiles will not include some or all of these determinations and processes. Some augmented reality sound profiles may include all of them. This is dependent upon the particulars of each augmented reality sound profile selected. In cases in which the augmented reality sound profile does not call for any such determination at 725, 735, 745, and 755; the process may merely proceed ("no" at any of 725, 735, and 745) to the next step without making any determination regarding that step.

If the augmented reality sound profile calls for audio recognition of particular ambient sounds ("yes" at 725"), then the ambient audio characterized, matched, and identified as shown at 730. This audio may be a particular sound, as opposed to an overall ambient soundscape, described with respect to FIG. 5. This specific audio for a particular sound may be acted upon by the augmented reality sound system 140 so as to augment the audio reality of a user of the system 140.

The process of characterizing, matching, and identifying ambient audio as shown at 730 is described in greater detail with respect to FIG. 8 below. Here, it is sufficient to note that the process involves comparing the ambient audio with a database of known sounds and identifying those sounds that most-closely match the ambient audio. Thereafter, the ambient audio may be identified which may merely mean audibly telling a user of the system 140 what the audio is or may involve further processing of the audio and additions to the audio as described below.

If the augmented reality sound profile calls for the addition of augmented audio ("yes" at 735), then the augmented audio is obtained at 740. This audio may be from the augmented reality parameter memory itself, for example, a set of pre-recorded sounds regarding directions, "beeps", or other sounds that direct or otherwise enhance the ambient audio. The augmented audio may be, in whole or in part, responsive to the ambient sound or responsive to location of the system 140. For example, the augmented audio may capture, record, and analyze ambient sound in order to pick out particular aspects of that sound and to shortly-afterward emphasize those sounds or their direction, relative to where an individual wearing the augmented reality sound system is located.

For example, the augmented reality sound system may receive ambient audio including audio matching characteristics of a particular species, genus (or other subcategory) of bird song. The bird song may be isolated from the additional ambient audio. Thereafter, the augmented reality sound system may make a determination that the bird song matches characteristics associated with the particular species of bird. The augmented reality sound system may then notify a user of the system that the bird song is from a particular species of bird (e.g. "This bird song [playback the bird song or a pre-recorded version of the bird song] is made by a male mockingbird."). Additional information may also be provided, if desired, such as mating habits, habitat, migration patterns, level of commonality, and other, relevant information. The augmented reality sound system may further identify the location and/or direction from which the sound came. This process may be assisted, in part, by the geo-location function 440 using location data 435 in conjunction with processing parameters in the location-based parameter memory 430.

By way of another example, the augmented reality sound system may receive ambient audio matching the characteristics of an explosion (e.g. the audio fills the frequency range, the rise and fall of the filled frequency range is extremely quick, and the audio may include echoes thereafter). After receipt of that sound, the augmented reality sound system may determine that the sound heard matches the characteristics associated with an explosion. Thereafter, audio such as a beep, a voice guidance system describing the relative location and approximate distance of the sound (e.g. "That [sound, e.g. explosion] was heard approximately 300 yards north, north-west of your present location."), playback of the identified sound over the present ambient sound, placed in the soundscape relative to its directionality or location when heard, or other augmented audio may be played back over the present ambient sound. In this way, these augmented audio sources may guide or alert a wearer of the augmented reality sound system to the location and estimated distance of the explosion (or other, identified sound).

This type of augmented audio is called "locational feedback" in this patent. "Locational feedback" is augmented audio superimposed over ambient audio that provides specific information regarding the location of one or more current or recent ambient sound features within the ambient sounds received by microphones used in the augmented reality sound system. Because human ears are "plugged" or otherwise occluded by earpieces, earbuds, or headphones while using the system, additional feedback may be injected into the audio provided to a user to aid in spatialization or localization of ambient sounds. This augmented audio superimposed as "locational feedback" may further be "placed" within a three dimensional soundspace at its location. Otherwise, physical locational information otherwise typically available to human ears may be partially or fully occluded by the headphones. Using two speakers, one in each ear, locational feedback may be created in such a way that it "sounds" to a hearer as though it is at the specific location in the exterior world from which the ambient sound feature came. This may be particularly the case when that locational feedback is superimposed over the ambient audio soundscape.

By way of a further example, the augmented audio may be audio retrieved from a personal computing device 120 in response to the user of the system 140 being in a particular location. For example, every time an individual goes to the "beach" as determined by the system 140 (e.g. using GPS software and hardware in the personal computing device 120), the individual may wish to have a particular song or soundtrack superimposed over the ambient sound when at that location. Still further, when a user is in that location with a person (as also determined by that person's personal computing device), the augmented reality sound system 140 may overlay a particular sound source over the ambient audio while still, in both cases, enabling the user of the system 140 to hear all ambient sounds as well. In this way, life itself can have a soundtrack that does not interfere with normal human communications and reactions. The selection of a song and/or playlist may be learned by the system over time and created as an augmented reality sound profile for use in that or those locations.

Next, the augmented audio is overlaid (or superimposed) upon the ambient audio 742. This superimposition may be in essentially real-time, superimposed over the ambient audio as it is output to a user of the augmented reality sound system via, for example, speaker 250. Essentially real-time means that the augmented reality sound system has sufficient time to receive, convert, analyze, operate on, re-convert for output and output the audio in a time not detectable as delayed by human hearing. In such cases, the augmented audio is overlaid in such a way that it is present along with any triggering ambient audio. For example, if a gunshot were a triggering ambient audio that causes the augmented reality sound system to insert a "beep" set within the sound space at or about the location of the gunshot, that "beep" may be placed within the ambient audio in real-time overlaid on top of the gunshot.

In some cases, the augmented audio may intentionally or based upon the implementation, be delayed slightly. So, in the example of the gunshot, a voice indicating the relative location of the gunshot may appear overlaid on the ambient sound following the gunshot by a predetermined time (e.g. 0.5 seconds) or by sufficient time for the augmented reality sound system to analyze the ambient audio and to react with the superimposed augmented audio.

Spatialization of audio may, itself, be used as an augmentation of the audio. For example, the ambient audio may be "moved" spatially within audio provided to a human ear further away from or closer to a user of the system. In this way, the ambient audio may become more or less immediate. For example, sirens in the ambient audio may be made to sound as though they are incredibly close to a user (closer than they are in reality) to emphasize their urgency or may be localized more strongly in a particular direction so as to emphasize a direction to a user. This may take place while other sounds are localized further away, respectively.

Similarly, spatialization between ambient audio and augmented audio (or secondary audio, discussed below) may be altered so as to, itself, provide augmentation to the overall soundscape. Ambient audio may be made to sound more distant while augmented audio is made to sound closer or vice versa. The placement of either may be altered in the sound heard by a user of the system so as to better localize either the ambient audio, an aspect of the ambient audio, or augmented audio.

The spatialization may be automatic, in the case of processing parameters directing either the ambient audio, augmented audio, or secondary audio to be present in a particular location or to move closer or further from a user of the system. Alternatively, a user may be presented with a menu, for example, on the personal computing device 120, that enables the user to visibly change the auditory location or auditory distance from a user of aspects of the audio (including ambient, augmented, or secondary audio). In this way, a user (or the system may automatically) may alter the way in which perceived sounds appear to be present within a virtual sound space that is being provided to the user.

Next, after augmented audio is overlaid or if no secondary audio is to be overlaid based upon the processing parameters ("no" at 735), a determination of whether multiple ambient audio sources 745 should be evaluated by the augmented reality sound system. This process may be used to better-evaluate the location of a source of a particular portion of ambient audio, for example, using the geo-location function 440 of multiple augmented reality sound systems interconnected by the cloud 130. Alternatively, multiple sources of ambient sound may be analyzed to better-identify a suitable augmented reality sound profile based upon a number of augmented reality sound systems effectively "voting" on the most appropriate augmented reality sound profile based upon each augmented reality sound system's independent analysis of the ambient sound and communicating those results to one another via the cloud 130.

If multiple ambient sources are to be used ("yes" at 745), then those multiple ambient audio sources are obtained and processed at 750. This processing may take place independently for each source, with processing occurring on each of the interconnected augmented reality sound systems (e.g. 140, 140', 140"). This is one example of a situation in which the augmented reality sound systems 140, 140', and 140" may communicate with one another to accomplish a task.

Alternatively, this processing may take place using a server or other computing device connected to the cloud 130 based upon audio received from each of the interconnected augmented reality sound systems. In circumstances in which independent processing occurs, further processing, at 750, may still take place at a central location such as the cloud 130.

Once processing is complete, the multiple ambient audio sources are incorporated into the ambient sound for one or more of the augmented reality sound systems at 752. This may involve including audio, received only by one microphone of the interconnected augmented reality sound systems, in the ambient audio of each of the interconnected augmented reality sound systems. For example, if one of the microphones of one of the augmented reality sound systems picks up a whispering human voice to the far right of a group of interconnected augmented reality sound systems, the same whisper may be isolated, amplified and simultaneously provided to all augmented reality sound systems at once or immediately following receipt of the noise. In this way, multiple ambient sources may be combined to augment the ambient audio.

Next, once multiple ambient audio sources are incorporated at 752 or if multiple ambient sources are not to be included based upon the processing parameters ("no" at 745), then a determination whether live audio should be included is made at 755. Live audio is audio, separate from ambient audio, that is generated in substantially real-time from another source. For example, a radio or television broadcast may be or include "live audio" that may be overlaid on top of ambient audio.

One option for the augmentation of ambient sound with live audio may be enjoying a sporting event, such as a football or baseball game while at the stadium with audio from a live radio announcer broadcast superimposed over ambient audio. In this way, a user of the augmented reality sound system can still hear all of the local ambient audio associated with being present at the game. In addition, a live radio announcer may also be superimposed over the ambient audio. Earlier systems typically rely upon an earbud disposed within a single ear of a wearer so that a user may hear all of a radio broadcast and, with only one ear, the ambient sound. Alternatively, a past user may have used two earphones, but the resulting audio was only of the radio broadcast, effectively blocking out the ambient audio. In contrast, the use of live audio here does not block any ambient sound, indeed it is designed to mirror the present ambient sound as nearly as possible in both ears. However, relevant frequencies of the live radio broadcast may be isolated and combined with ambient sound, in real-time or with a near-imperceptible delay, to create augmented reality sound.

If secondary audio is to be incorporated ("yes" at 755), then the secondary audio feed is obtained at 760. The secondary audio stream may be live audio, such as a radio broadcast or an audio feed directly from a mixing board at a live concert or other event. Alternatively, the secondary audio stream may be pre-recorded audio like music in the form of a stream of audio, a stored audio file, or pre-recorded vocal cues such as directions or a museum guided tour. The secondary audio stream may, in part, be based upon locational data.

The secondary audio stream may be obtained, for example, from an Internet audio stream on a personal computing device, such as personal computing device 120, in wireless communication with the ambient audio processing, such as ambient audio processing 110. Alternatively, the secondary audio stream may be obtained by an integrated or independent radio frequency receiver, either terrestrial or satellite, that receives audio streams comprising audio and/or video signals. In the case of video signals, the video portion of the signal may be removed or ignored for audio-only processing.

The secondary audio stream may be, for example, a direct feed provided by an audio engineer at a live concert, thus giving a user of this system the ambient sound experience of a live concert (e.g. the crowd sound, the background, awareness of one's friends and communication with those friends, etc.), but provide the best-quality audio from the concert without interference from distance from the stage or the crowd or any number of other variables.

Next, the secondary audio stream may be overlaid on the ambient sound at 762. This may include stripping out the majority of frequency background noise so as to not unduly mask ambient sound with background noise that is irrelevant to the intent of the live audio. This may also involve selecting a volume at which to overlay the live audio relative to the ambient sound. If the ambient sound is relatively low, it may be taxing on the human ear to overlay audio that is extremely loud or spans many frequencies on top of that ambient sound. If the ambient sound is robust, the volume of a secondary audio stream overlay must be sufficiently loud to be heard over the din.

Alternatively, the secondary audio stream may wholly replace the ambient sound at 762. In this case, the ambient sound may be processed as a "secondary" source to add character to the otherwise more-perfect audio experience directly from the audio engineer at the concert. The ambient sound may be mixed in, at a lower volume so as to not distract from the audio, but to ensure that the experience resembles a live concert.

Next, after secondary audio stream is overlaid at 762 or it is determined based upon processing parameters that no secondary audio is to be overlaid ("no" at 755), the ambient sound is processed with augmented reality sound superimposed at 770. At this step, the various augmented reality elements that are directed by the processing parameters are combined into a single audio stream for output through the speaker of the augmented reality sound system to the ears of a wearer.

In cases in which augmented reality audio is synchronized with the associated ambient audio (additional sounds superimposed over an ambient sound as the ambient sound is played through a speaker to a wearer), this process may include a non-perceptible delay to enable the sound to occur, to superimpose the augmented audio over the ambient sound, then play them back to a wearer of a speaker together. In cases in which the augmented reality audio is delayed relative to a triggering audio component, ambient audio may continue being output through a speaker with the augmented reality audio being combined after-the-fact and played back at a slight delay to the triggering audio component. In either case, the augmented reality audio is superimposed over ambient audio such that both may be heard.

Before the process ends, the settings used or edited during this process may be stored at 780. That is, the processing parameters associated with the selected augmented reality sound profile may be changed as a result of further information regarding the location, multiple sources, or live audio sources. Those changes may be reflected in an updated or new augmented reality sound profile that may be stored at 780.

The process 700 of augmented ambient audio operates continuously as ambient audio is received. Nonetheless, the processes repeated are substantially identical until a different augmented reality sound profile is selected, either automatically or by a user. This process ends at 795, while another for the next sub-division of ambient audio may just be beginning.

Figure 8:
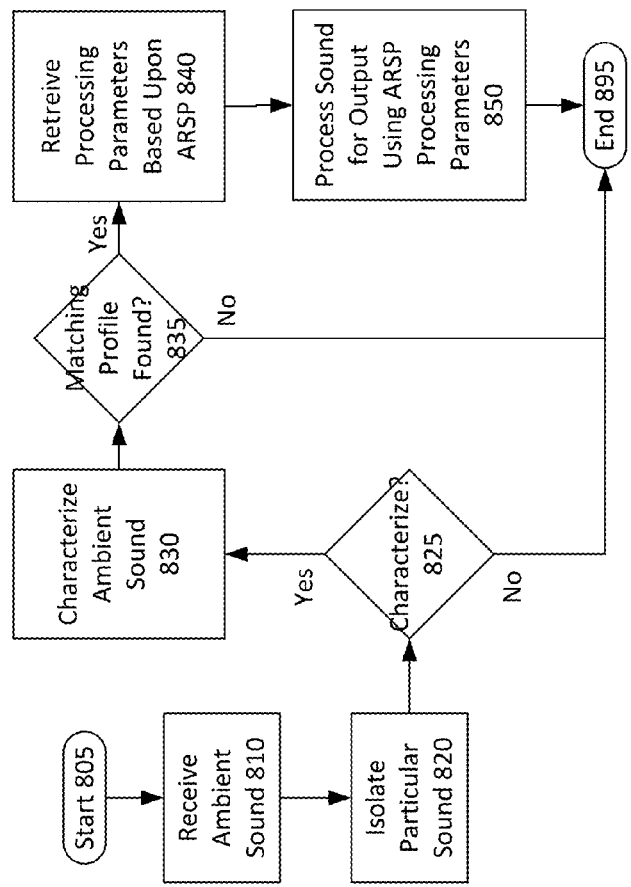
FIG. 8 is a flow chart of a process for characterizing an aspect of ambient sound.

Turning now to FIG. 8, a flow chart of a process 800 for characterizing an aspect of ambient sound is shown. The process begins at 805, but the process may occur continuously as new ambient sound is received at 810 by the augmented reality sound system 140. As each new sound is received (or a timeframe of sound) at 810, a determination is made whether to isolate a particular sound within the ambient sound at 820. This may be controlled by overall processing parameters set to "look for" sounds with particular characteristics. For example, a known sound (e.g. a beep or warning whistle) may have certain typical frequencies and be characterized by a certain length, pitch or other characteristics. If the characteristics are known, then individual sounds may be isolated, as shown at 820.

Once isolated, a determination whether the sound should be characterized is made at 825. This determination may be based upon a universal "switch" that tells the augmented reality sound system to characterize or not to characterize any (or a particular type of) ambient sound. For example, only certain frequencies, loudness, or lengths of sound (e.g. very loud and short) may be characterized. Alternatively, the system may always try to characterize if such a switch is set in the augmented reality processing parameters. If the system is not set to characterize ambient sound ("no" at 825), then the process will end at 895.

If the system is set to characterize ambient sound ("yes" at 825), then the first step is to characterize the ambient sound at 830. At this stage, the received ambient sound is analyzed, similar to the process disclosed with reference to FIG. 5, but this time for an individual sound, rather than the overall ambient sound in an environment. This process determines whether a particular sound profile stored in the augmented reality parameter memory 460 and used by the ambient sound characterization function 450 to determine the sound most closely like the ambient sound or sounds received by the system.

Next, a determination whether a matching profile is found is made at 835. This process may be similar to that discussed with respect to FIG. 6. If not ("no" at 835), then the process ends at 895. If so ("yes" at 835), then the processing parameters for that matching ambient sound are retrieved from the augmented reality parameter memory at 840 so that they may be applied to the audio. Next, the sound is processed according to the augmented reality sound profile processing parameters at 850.

The retrieved processing parameters may indicate, for example, that an audio voice-over should be applied following a gunshot to identify the general location or direction of a gunshot or merely to identify an ambient sound as a gunshot. In particularly accurate implementations, the augmented reality sound system 140 may be able to identify the type and caliber of a gunshot and provide this information, audibly, to a user of the augmented reality sound system 140. Alternatively, these parameters may be used to perform any number of other functions, depending on how well the augmented reality system is able to match a sound with a sound profile. For example, the augmented reality sound system 140 may be able to identify a particular individual's voice within the ambient sound and, based upon that voice, enable other functions. These functions may include merely reciting the name of that individual, audibly, only to the wearer of the augmented reality sound system 140. Alternatively, the system may enable playback of a particular song and/or track list from an associated portable computing device, with the audio of that song or track list superimposed over the ambient audio at a pre-determined volume.

Still further alternatively, these parameters may enable the augmented reality sound system 140 to identify individual calls of animals such as birds, wolves, moose, elk, or other wildlife. The audio may further enable identification of a general direction of the animal or animals and may audibly recite the name and/or general location of the received ambient sound. Further information, for example, in the case of an identified bird call, may be provided by audio recitation overlaid over continual ambient sound. This additional information may provide details about the habits, type, species, mating habits, and various other information about a particular animal.

Still further, these parameters may enable the augmented reality sound system to identify an audio song playing in the ambient sound (or, live, at a concert) and provide additional information regarding the audio. For example, at a concert, the portion of the audio representing the band's playback may be replaced with audio from a recorded source, for example, available on the portable computing device 120. Alternatively, after identification of the song, the augmented reality sound system may provide annotations to the song identifying the band member's names, the writer of the song, the album on which it appeared, and various other information related to the audio.

The processing parameters may further cause the augmented reality sound system 140 to cancel or provide counter-noise to counteract audio from the user's own voice as he or she speaks. Instead, the augmented reality sound system 140 may overlay his or her own voice with the sound of that user's voice as it is heard by others. As is known in the field of audio communications, an individual typically has only a limited perspective on the way they sound to people outside of their own bodies. There are multiple resonating places within the body including the ears, skull, throat, and nasal cavity that cause an individual's spoken (or sung) voice to sound substantially different within that individual's head than it sounds to others. The augmented reality sound system 140 may actively noise cancel those internal sounds and replace an individual's spoken voice with the sound of that voice received on the exterior of that individual's body so as to provide a user with a more-accurate representation of his or her voice.

Alternatively, or in addition, the processing parameters 425, retrieved at 840 and used at 850 may act on ambient audio (and the audio within a human's body) to perform active noise cancellation on all sources of ambient audio except for that user's voice and an individual with whom that user is communicating. In this way, the user may be able to carry on a conversation in an otherwise loud room or space. Once the processing is complete, the process ends at 895.

Figure 9:
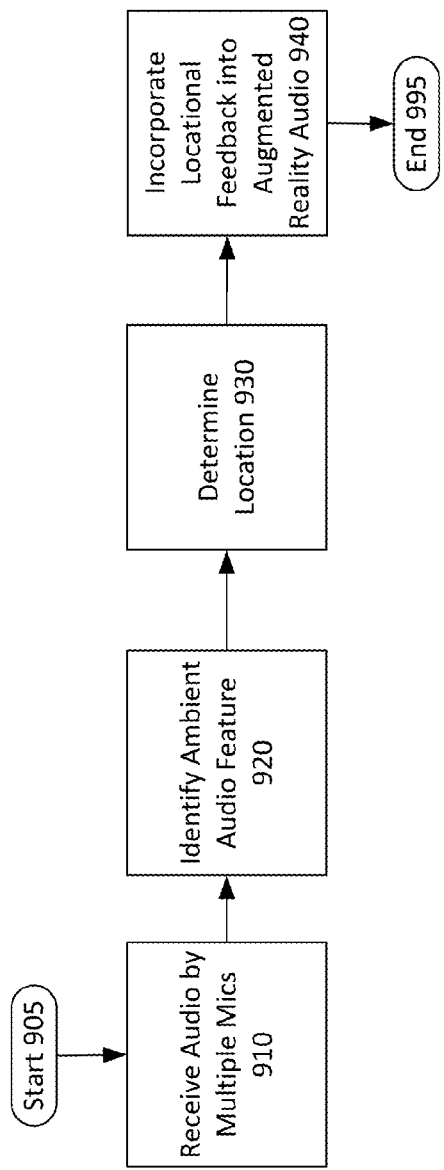
FIG. 9 is a flow chart of a method for locational processing ambient sound received from multiple, independent microphones.

Turning now to FIG. 9, a flow chart of a process 900 for locational processing ambient sound received from multiple, independent microphones is shown. The process begins at 905, but may operate continuously while multiple microphones are in communication with one another to increase the functionality of multi-microphone ambient audio augmentation. The multiple microphones may be, for example, two (or more) microphones disposed on either side of a human head. Alternatively or in addition, the multiple microphones may include one or more additional sets of microphones on either side of other user's heads in proximity to a first wearer. These microphones may each be in communication with augmented reality sound systems 140, 140' and 140" respectively. The multiple microphones may also include microphones not integrated with an earpiece, such as one or more microphones in personal computing devices associated with or in wireless communication with an augmented reality sound system.

After the process 900 begins, ambient audio may be received by the multiple microphones at 910. This may include ambient audio received by an ambient audio function 110, each independently operating for each ear, or may involve the receipt of audio by multiple microphones at a central location, such as the personal computing device 120 or a server 132 within the cloud 130.

Next, the ambient audio feature is identified at 920. This may be, using the example discussed above, a gunshot, or human footsteps, human whispering, a baby crying, or any other particular feature of ambient sound that may be detected. This detection may rely upon waveforms, frequency ranges, the build and decay of a particular ambient audio feature (e.g. a gunshot builds and decays extremely quickly relative to most other sounds), or other types of detection. Detection may involve, much like the ambient sound identification above, processing and characterizing the ambient sound (including any ambient audio feature), then comparing the characterized ambient audio feature with a database of known sounds to find a match or the closest match to one or more of those known sounds.

Next, the location of the isolated sound is determined at 930. Relative distance of several microphones, either on a single user's head or on multiple user's heads may be calculated. This process may take into account the amplitude of the sound at receipt, the ratio of direct sound to reverberated sound (e.g. the more reverberation received, the further the sound is away), and the amount of high-frequency range energy in the sound. As sound travels through air, the high frequency ranges drop at a predictable rate over that distance. Finally, there is recent research that suggests that amplitude modulation is yet another characteristic that may be used to determine relative distances of sound. These types of algorithms are known in the art.

Triangulation may also be used if multiple microphones are available. Sound travels relatively slowly in air—approximately 1,126 ft/s (or approximately 768 mph) in typical conditions. Thus, for ambient audio features, even slight delays in receipt of sound can be used, in conjunction with locational data from a geo-location function 440, to derive the relative location of an ambient audio feature. If three or more microphones are available, the sound location may be calculated. If more than three microphones are used, the location can be better-triangulated and more-closely calculated to the actual location. The nearest microphone may then be identified based upon the microphone that first received the ambient sound feature.

However determined, this locational feedback may be incorporated into the augmented reality audio at 940. As discussed above, this may involve overlaying additional audio, increasing the volume of audio, incorporating "beeps", incorporating voice guidance or any number of other elements to augment the ambient audio with locational feedback to aid a wearer of the augmented reality sound system in locating particular ambient sound features. Though the process 900 may be repeated, it may now end at 995.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An augmented reality sound system, comprising:
   at least one microphone for receiving ambient sound;
   a memory storing one or more augmented reality sound profiles each associated with one or more processing parameters; and
   a processor coupled to the memory and configured to:
      analyze the ambient sound to produce processed sound that at least emphasizes one or more particular aspects of the ambient sound; and
      generate augmented ambient sound from the ambient sound by reproducing the ambient sound in conjunction with the processed sound superimposed over the ambient sound as directed by one or more of the set of processing parameters retrieved from the memory based on a selected augmented reality sound profile.

2. The augmented reality sound system of claim 1, further comprising a plurality of microphones, in addition to the at least one microphone and wherein the processor is further configured to:
   receive ambient sound from the plurality of microphones; and
   automatically select an augmented reality sound profile at least in part based upon the ambient sound received from the plurality of microphones.

3. The augmented reality sound system of claim 2 wherein the plurality of microphones are dispersed between more than one individual.

4. The augmented reality sound system of claim 2 further comprising a personal computing device, coupled to the processor via a wireless communication link, the personal computing device including at least one of the plurality of microphones.

5. The augmented reality sound system of claim 1, wherein the processor is further configured to:
   analyze digitized ambient sound to generate an ambient sound profile, compare the ambient sound profile to at least one of the one or more augmented reality sound profiles, and select the selected augmented reality sound profile of the one or more augmented reality sound profiles that is appropriate for the ambient sound profile according to predetermined criteria.

6. The augmented reality sound system of claim 1, wherein the selected augmented reality sound profile is selected by someone other than a wearer of the at least one microphone.

7. The augmented reality sound system of claim 1, wherein the one or more of augmented reality sound profiles that create processed sound include at least one of the following: increased volume of at least one specific frequency range of the ambient sound, decreased volume of at least one specific frequency range of the ambient sound, insert pre-recorded sound as a part of the processed sound superimposed over the ambient sound, pre-recorded sound providing additional information about an identified ambient sound, pre-recorded sound identifying a sound in the ambient sound, a live audio feed directly from audio equipment of a live audio performance, pre-recorded sound selected based upon a user location, pre-recorded sound selected based upon the presence of another in proximity to a user of the system, locational feedback to the user of the system in response to a particular ambient sound in a specific frequency range so as to better-identify a direction of the particular ambient sound to the user of the system, auditory directions to the user of the system so as to enable them to navigate to a location while reproducing the ambient sound so as to not impede user hearing of the ambient sound, and reproduction of live audio superimposed over the ambient sound.

8. The augmented reality sound system of claim 1 further comprising:
a second at least one microphone, a second memory and a second processor as described in claim 1 used to generate a second augmented ambient sound;
the second at least one microphone for receiving a second ambient sound; and
a third processor for combining the ambient sound from the at least one microphone and the second ambient sound from the second at least one microphone to create a multi-source ambient sound and using the multi-source ambient sound to select the selected ambient sound profile.

9. The augmented reality sound system of claim 8, wherein the third processor is distinct from the first and second processors and located in one of a personal computing device and a server.

10. The augmented reality sound system of claim 1, further comprising:
a housing enclosing at least a portion of the processor and at least a portion of the memory;
a preamplifier, and an analog to digital converter to convert the ambient sound into digitized ambient sound input to the processor; and
a digital to analog converter, an amplifier, and a speaker to convert digitized processed sound output from the processor into processed output sound, wherein
the at least one microphone, the preamplifier, the analog to digital converter, the digital to analog converter, the amplifier, and the speaker are disposed within the housing.

11. The augmented reality sound system of claim 10, wherein:
the housing is an earbud housing configured to fit, at least partially, within and be supported by a user's ear.

12. The augmented reality sound system of claim 1, wherein the processor is further configured to generate augmented ambient sound from the ambient sound by reproducing the ambient sound in conjunction with informational feedback and the processed sound superimposed over the ambient sound.

13. The augmented reality sound system of claim 12, wherein the informational feedback includes information regarding a location of one or more ambient sound features within the ambient sound.

14. A method for processing ambient sound to provide augmented reality sound, comprising:
storing, in a memory, one or more augmented reality sound profiles, each associated with one or more processing parameters;
analyzing the ambient sound to produce processed sound that at least emphasizes one or more particular aspects of the ambient sound; and
generating augmented ambient sound from the ambient sound by reproducing the ambient sound received by at least one microphone in conjunction with the processed sound superimposed over the ambient sound as directed by one or more of the set of processing parameters retrieved from the memory based on a selected augmented reality sound profile.

15. The method of claim 14, further comprising:
receiving ambient sound from a plurality of microphones that are separate from the at least one microphone; and
automatically selecting an augmented reality sound profile at least in part based upon the ambient sound received from the plurality of microphones.

16. The method of claim 15, wherein the plurality of microphones are dispersed between more than one individual.

17. The method of claim 16, wherein a personal computing device includes at least one of the plurality of microphones and is coupled to the processor via a wireless communication link.

18. The method of claim 14 further comprising:
analyzing digitized ambient sound to generate an ambient sound profile,
comparing the ambient sound profile to at least one of the one or more augmented reality sound profiles, and
selecting an augmented reality sound profile of the one or more augmented reality sound profiles that is appropriate for the ambient sound profile according to predetermined criteria.

19. The method of claim 14, wherein the selected augmented reality sound profile is selected by someone other than a wearer of the at least one microphone.

20. The method of claim 14, wherein the one or more augmented reality sound profiles that create processed sound include at least one of the following: increased volume of at least one specific frequency range of the ambient sound, decreased volume of at least one specific frequency range of the ambient sound, insert pre-recorded sound as a part of the processed sound superimposed over the ambient sound, pre-recorded sound providing additional information about an identified ambient sound, pre-recorded sound identifying a sound in the ambient sound, a live audio feed directly from audio equipment of a live audio performance, pre-recorded sound selected based upon a user location, pre-recorded sound selected based upon the presence of another in proximity to a user, locational feedback to the user in response to a particular ambient sound in a specific frequency range so as to better-identify a direction of the particular ambient sound to the user, auditory directions to the user so as to enable them to navigate to a location while reproducing the ambient sound so as to not impede user hearing of the ambient sound, and reproduction of live audio superimposed over the ambient sound.

21. The method of claim 14 further comprising:
receiving a second ambient sound from at least one second microphone; and
combining the ambient sound from the at least one microphone and the second ambient sound from the at least one second microphone to create a multi-source ambient sound and using the multi-source ambient sound to select the selected ambient sound profile.

22. The method of claim 21, wherein the combining is performed on a processor located in one of a personal computing device and a server.

* * * * *